May 25, 1926.                     1,586,020
L. S. WITHERSPOON
HANDLE FOR CONTAINERS
Filed Oct. 17, 1924     2 Sheets-Sheet 2
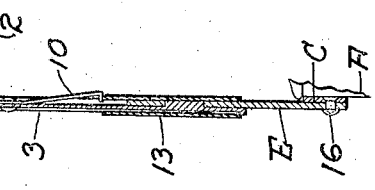
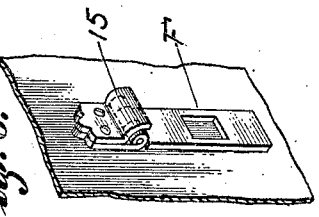
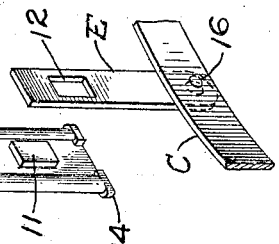
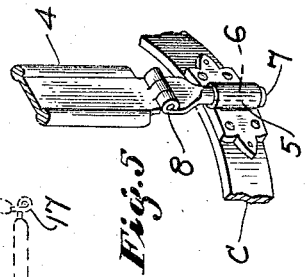
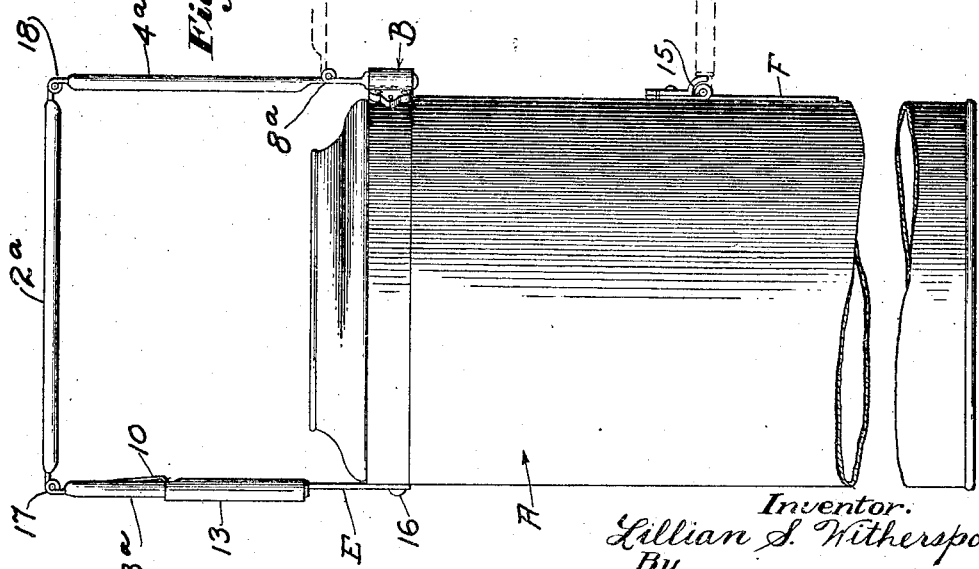
Inventor:
Lillian S. Witherspoon
By
Dewey, Strong, Townsend & Loftus
Attorneys.

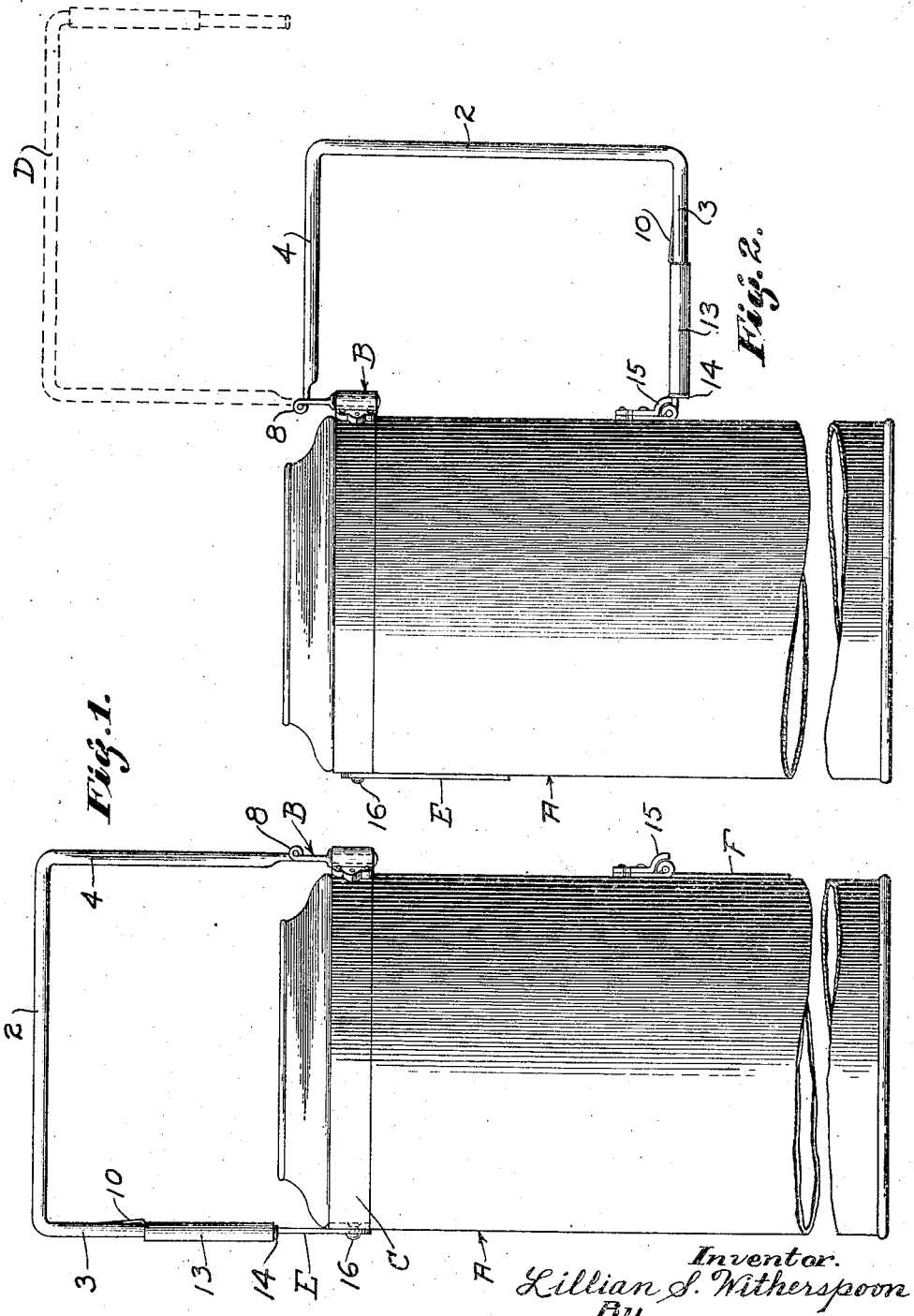

Patented May 25, 1926.

1,586,020

UNITED STATES PATENT OFFICE.

LILLIAN S. WITHERSPOON, OF SAN FRANCISCO, CALIFORNIA.

HANDLE FOR CONTAINERS.

Application filed October 17, 1924. Serial No. 744,118.

This invention relates to handles for containers and the like, and especially to an adjustable handle.

The object of the present invention is to generally improve and simplify the construction and operation of handles of the character described; to provide a handle which may be attached to containers, such as vacuum-bottles and the like; to provide a handle which may assume various positions with relation to the container to which it is attached; and further, to provide means for readily and quickly locking or releasing the handle at will when changing the position thereof.

One form which my invention may assume is exemplified in the following description and illustrated in the accompanying drawings, in which—

Fig. 1 is a side elevation of a container showing the handle applied and assuming one position.

Fig. 2 is a similar view showing the handle assuming another position.

Fig. 3 shows a slightly modified form of the handle.

Fig. 4 is a perspective view of the locking mechanism employed.

Fig. 5 is a perspective view of a universal connection formed between one end of the handle and the container.

Fig. 6 is a perspective view of the locking member with which the handle interlocks when assuming the position shown in Fig. 2.

Fig. 7 is a sectional view showing the parts interlocked.

Referring to the drawings in detail, and particularly to Figs. 1 and 2, A indicates a container of any suitable character, as, for instance, a vacuum-bottle or the like. The average size vacuum-bottle is fairly heavy and is usually sufficiently large in diameter to render it awkward to handle, this being particularly true when women are concerned as their hands are usually smaller than a man's and it is for this reason that most women require the use of both hands when pouring from a vacuum-bottle or when otherwise handling the same. The purpose of the present invention is that of providing a handle which may be readily attached to a vacuum-bottle or other container, and which may assume various positions with relation thereto. For instance, that of a bail when the container is to be carried from place to place, and that of a side handle when the contents of the container are being poured out. A handle of this character permits the container to be readily handled by one hand and a glass or other receptacle may thus be held by the other hand when pouring out the contents.

The handle proper consists of a hand-grip section 2 and a pair of connected sections 3 and 4. The extended section 4 is secured by means of a universal connection generally indicated at B to the container through means of a band C or like device which surrounds the container and which is suitably secured thereto.

The universal connection B consists of a bearing member 5 (see Fig. 5) in which is journalled a pin 6, said pin 6 being secured against endwise removal by end collars 7 or the like. The bearing member, together with the pin journaled therein, is vertically disposed and the handle is attached thereto by means of an ordinary hinge joint, such as indicated at 8. The hinge permits movement of the handle so that it may assume either of the full line positions shown in Figs. 1 and 2, the dotted line position shown at D in Fig. 2, or, in fact, any intermediate position, and the vertical swivel or connection formed by means of the bearing member 5 and pin 6 permits swinging movement of the handle on a horizontal plane, this being an important feature, as will hereinafter be described.

One end of the handle is in reality permanently secured to the container by means of the band C and the universal connection generally indicated at B. This universal connection, however, permits several movements and the two positions shown in Figs. 1 and 2 may therefore be assumed. The free end of the handle or the extension indicated at 3 is interlocked when in use either with the member indicated at E or the member indicated at F. Both these members are substantially similar in construction, as shown in Figs. 4 and 6, but a detail description will nevertheless be rendered.

By referring to Fig. 4, it will be noted that the lower end of the handle extension 3 is provided with a spring catch 10 and a rectangularly-shaped projecting lug 11. It will also be noted that the inner face of the handle extension is recessed or channelled, and that it is adapted to receive the interlocking member E. This member has a hole or recess 12 formed therein for the reception of the lug 11, and an interlock is formed between these members. Removal of the lug 11 with relation to the member E, or the hole into which it projects, is taken care of by means of a slidably mounted sleeve 13. This sleeve telescopes or slides on the extension 3 of the handle and may either assume the position shown in Fig. 4, where it covers the spring latch 10 or the lowered position shown in Fig. 1 when it has passed downwardly over the interlocking members 11 and 12, the sleeve being secured in this position by engagement with the lower end of the spring latch and also by a stop-collar 14 formed on the lower end of the handle extension 3.

The interlocking member F, which is attached to the side of the container as shown in Fig. 6, is identical in construction to the interlocking member E. The lug 11 enters the opening in the interlocking member F when the handle assumes the full line position shown in Fig. 2 and the members are retained in interlocked position by means of the sliding sleeve 13.

The operation of the device is as follows: With the handle attached to the container A, as shown in Fig. 1, it can be seen that the handle may serve the function of a bail whereby the container may be readily carried; that is, the handle straddles the top of the container and as it is interlocked with the member E, danger of the handle becoming detached is entirely obviated. If it is desired to pour from the container, it is only necessary to depress the spring latch 10 so that the sleeve 13 may be moved upwardly to release the interlocking members. When they are released, the handle is swung about the vertical pivotal connecting members 5 and 6 a distance of 180°. It will then assume the dotted line position indicated at D in Fig. 2. It is then swung about the hinge connection 8 in a downward direction, and it will then assume the full line position shown in Fig. 2, it being here interlocked by lifting the member F upwardly so that the lug 11 will enter the opening in the interlocking member, and the members are interlocked by sliding the sleeve over the members and securing it by means of the latch 10.

The handle, when assuming the position shown in Fig. 2, serves the same function as the side handle on an ordinary can or mug, and therefore permits the container to be readily manipulated when pouring out the contents, and it certainly leaves the other hand free for other purposes. It will also be noted that the handle is rigid when assuming the position shown in Fig. 2, as upward movement of the handle is positively prevented by means of a lug 15, which limits upward movement of the interlocking member F. This member is hingedly secured and therefore hangs downwardly and out of the way, as shown in Fig. 1, when not in use. This is also true of the member E, as it is pivotally attached to the band C, as indicated at 16. It may therefore assume either the position shown in Fig. 1, or that shown in Fig. 2.

The lug 15 is of particular importance when the form of structure shown in Fig. 3 is employed. In that instance, the hand grip section 2ᵃ is secured to the extending members 3ᵃ and 4ᵃ by hinge connections 17 and 18 respectively. A hinge 8ᵃ, similar to that shown in Fig. 5, is also employed but the vertical pivotal connection, to-wit, the members 5 and 6, may be entirely eliminated; that is, when the handle assumes the full line position shown in Fig. 3 and it is desired to change it to form a side handle, it is only necessary to release the interlocking members E and 13 and then to swing or fold the handle sections to assume the dotted line position shown in Fig. 3, where they may again be interlocked by connecting the members F and 13. The lug 15 is here of particular importance as hinge connections are formed at the points 8ᵃ, 17 and 18; that is, the handle would fold up like a parallelogram unless means were employed for limiting its movement. The lug 15 serves this function and such movement is therefore eliminated. Adjustment of the handle is important for other reasons. For instance, if it were permanently attached to the side of a container, it would, obviously, consume considerable space when inserted in a case. Therefore, by changing the position of the handle so that it extends across the top thereof, for instance, when carrying the container, it conserves diametric space, thereby allowing the container, together with the handle attached thereto, to be readily inserted in a case, for storage, shipment or otherwise.

While certain features of the present invention are more or less specifically illustrated, I wish it understood that various changes in form and proportion may be resorted to within the scope of the appended claims. I similarly wish it understood that the materials and finish of the several parts employed may be such as the experience and judgment of the manufacturer may dictate or various uses may demand.

Having thus described my invention, what I claim and desire to secure by Letters Patent is—

1. The combination with a container of a handle therefor, said handle being adjustable to straddle the container in one position and to form a side handle in another position, a connection between one end of the handle and the container permitting the handle to be swung to the side of the container or to straddle the container, and means for securing the opposite end of the handle in either position.

2. The combination with a container, of a handle therefor, said handle being adjustable to straddle the container in one position, and to form a side handle in another position, a pivotal connection between one end of the handle and the container, and two points of attachment on the container to receive the other or free end of the handle.

3. The combination with a container, of a handle therefor, said handle being adjustable to straddle the container in one position, and to form a side handle in another position, a connection between one end of the handle and the container permitting vertical swinging movement of the handle about the connection, and two points of attachment on the container to receive the other or free end of the handle.

4. The combination with a container, of a handle therefor, said handle being adjustable to straddle the container in one position, and to form a side handle in another position, a permanent pivotal connection between one end of the handle and the container, two points of attachment on the container to receive the other or free end of the handle, and locking means whereby the free end of the handle is adapted to be secured to the container at either point of attachment.

5. The combination with a container, of a handle therefor, said handle being adjustable to straddle the container in one position and to form a side handle in another position, a compound hinge forming a connection between one end of the handle and the container, said compound hinge permitting swinging movement of the handle on a horizontal plane and also permitting swinging movement of the handle in a vertical plane, two points of attachment on the container to receive the other or free end of the handle, and locking means whereby the free end of the handle is adapted to be secured to the container at either point of attachment.

6. The combination with a container, of a handle therefor, said handle being adjustable to straddle the container in one position and to form a side handle in another position, a compound hinge forming a connection between one end of the handle and the container, said compound hinge permitting swinging movement of the handle on a horizontal plane and also permitting swinging movement of the handle in a vertical plane, a pair of plates attached to the container, one on the side and one at a point adjacent the upper end of the container, an interlocking member carried by the other or free end of the handle and adapted to interlock with either of said plates, and means carried by the handle for securing the interlocking member when in engagement with either of said plates.

7. In a device of the character described, the combination with the handle and a perforated plate with which it is adapted to interlock, of a lug on the handle adapted to enter the perforation in the plate, a sleeve carried by the handle and adapted to slide over the lug and the perforated plate to retain the plate and lug in interlocked position, and means for limiting the sliding movement of the sleeve and for locking the sleeve against sliding movement.

8. In a device of the character described, the combination with the handle and a perforated plate with which it is adapted to interlock, of a lug on the handle adapted to enter the perforation in the plate, a sleeve slidably mounted on the handle and adapted to enclose the perforated plate and the lug in one position, and adapted to release said members when in another position, and a spring latch engageable with the sleeve to lock it against sliding movement when the lug and perforated plate are interlocked.

9. A handle for containers comprising a means adapted to surround a container and to be secured thereto, an adjustable bail shaped handle attached to said member, said handle adapted to straddle the container in one position and to form a side handle in another position, a swivel connection between one end of the handle and said surrounding member, and two connecting members adapted to receive and secure the other free end of the handle.

10. A carrying member for containers adapted to form a bail in one position and a side handle in another position, pivots permitting swinging movement of the carrying member both on a horizontal and vertical plane to assume either of said positions, and means for retaining the carrying member in either position.

11. The combination with a container of a bail mounted thereon, one end of said bail being connected to permit swinging movement of the bail to transpose the bail to a side position relative to the container to form a side handle therefor.

12. The combination with a container of a bail mounted thereon, one end of said bail being connected to permit swinging movement of the bail to transpose the bail to a side position relative to the container to form a side handle therefor, and means for securing the other end of the bail either in the side position or in the straddling position.

13. A handle for containers, said handle adapted to straddle a container in one position and form a side handle in another position, a common means securing one end of the handle to the container both in the straddling and in the side position, and a second means securing the opposite end of the handle when in a straddling position and a third means securing said opposite end of the handle when in a side position, said last named means being disposed at a point intermediate the top and bottom of the container.

LILLIAN S. WITHERSPOON.